United States Patent [19]

Heck

[11] 3,922,299

[45] Nov. 25, 1975

[54] VINYLIC SUBSTITUTION REACTIONS

[75] Inventor: Richard F. Heck, Wilmington, Del.

[73] Assignee: University of Delaware, Newark, Del.

[22] Filed: Mar. 5, 1974

[21] Appl. No.: 448,246

[52] U.S. Cl...... 260/476 R; 260/468 K; 260/471 R; 260/473 R; 260/475 R; 260/486 R; 260/488 CD; 260/491; 260/515 R; 260/599; 260/618 R; 260/642; 260/668 R; 260/678
[51] Int. Cl.² .......................................... C07C 69/76
[58] Field of Search ................... 260/476 R, 488 CD

[56] References Cited
UNITED STATES PATENTS

| | | | |
|---|---|---|---|
| 3,625,996 | 12/1971 | Fenton | 260/469 |
| 3,674,884 | 7/1972 | Moritani | 260/476 R X |
| 3,705,919 | 12/1972 | Heck | 260/476 R X |
| 3,714,228 | 1/1973 | Massie | 260/476 R |
| 3,769,325 | 10/1973 | Fenton | 260/476 R |

*Primary Examiner*—Richard L. Raymond

[57] ABSTRACT

Vinylically and/or allylically substituted organic compounds or tautomers or reduced forms thereof are formed when certain organometallic derivatives of Group VIII metals are reacted at 0° to about 200°, with olefinic compounds possessing at least one hydrogen on a vinylic position. The organometallic derivative should have the formula $RMX_a(ER_3')_b$, where R is an aryl, benzyl, vinylic or ethynyl group or a substituted derivative thereof with such substituents as lower alkyl groups, aryl groups, heterocyclic groups, halogen groups, nitro, cyano, carboalkoxyl, aldehyde, ketonic, dialkylamino, phenolic or hydroxylic groups. The M is a Group VIII metal, X is Br, Cl or I and $ER_3'$ is a trivalent arsenic or phosphorus group with R' a lower alkyl, aryl, alkoxyl, halogen or phenoxy group. The letters a and b are such as to make the molecule stable with the usual number of coordinating groups. With some of the organometallics the reaction can be carried out in a catalytic manner in the metal by including a base such as a basic tertiary amine in the reaction mixture to remove hydrogen halide from the reactants and also by having RX present to reform the $RMX_a(ER_3')_b$ after each reaction cycle. A representative example is the preparation of methyl cinnamate in 85% yield from bromobenzene, methyl acrylate, tetramethylethylenediamine, one mole percent of palladium acetate and two mole percent of triphenylphosphine at 125° for 28 hours. In this example the bromobenzene, palladium acetate and triphenylphosphine from the organometallic compound trans-$C_6H_5Pd(Br)[P(C_6H_5)_3]_2$, under the reaction conditions.

2 Claims, No Drawings

VINYLIC SUBSTITUTION REACTIONS

The Government has rights in this invention pursuant to Grant No. 73-75-GP-34492X awarded by the National Science Foundation.

This invention relates to the preparation of ethylenically or allylically substituted unsaturated compounds or tautomeric or reduced forms thereof by reaction of certain ethylenic compounds with certain organometallic derivatives of Group VIII metals. The invention further relates to bringing about this reaction catalytically with respect to the metal, in some instances, where inclusion of a base such as a basic tertiary amine and an organic halide can bring about the reformation of the organometallic derivative after each cycle of the reaction in the reaction mixture.

It is known that palladium metal in the presence of a basic tertiary amine or sodium acetate will catalyze the vinylic substitution reaction of olefinic compounds with aryl iodides, styryl bromides and benzyl chloride. The reaction apparently proceeds by way of unstable organopalladium compounds. (R. F. Heck and J. P. Nolley, Jr., Jr. Org. Chem. 37, 2320(1972) and T. Mizorki, K. Mori and A. Ozaki, Bull. Chem. Soc. Japan 44, 581(1971)). These reactions, however, are severely limited in two respects. They proceed only with aryl and vinylic iodides or slowly with styryl bromides and benzylic chlorides. The much less expensive and more readily available aryl and vinylic bromides and chlorides generaly do not react at all or at least give only a few percent yield of product even at high temperatures. Of course there may be a few highly activated halides which are exceptions to these generalizations but none of these have been disclosed. The other limitation of the prior art is that the reaction with cis or trans olefins does not proceed with useful stereospecificity - mixture of products are obtained which generally contain predominantly the thermodynamically most favored olefinic product. It is the object of the present invention to overcome both of these limitations and substantially increase the usefulness of the reaction.

In accordance with the present invention it has been found that Group VIII metal compounds of the general formula $R-M(X)_a(ER_3')_b$ will bring about the substitution reaction of a vinylic hydrogen in an olefinic compound by the organic group, R, in the organometallic. The reaction is believed to proceed according to the following equations in which

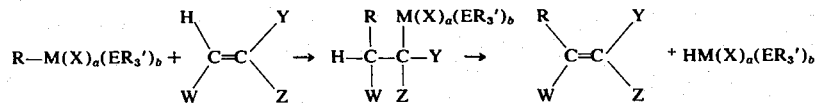

R is an organic group, M is the Group VIII metal, $ER_3'$ is a trivalent arsenic or phosphorous compound, "$a$" and "$b$" are small numbers sufficient to allow formation of a complex with a normal coordination number, and W, Y and Z are hydrogens, alkyl, aryl, cycloalkyl, nitrile, carboalkoxyl, acyloxy, aldehyde, alkoxyl or nitro groups. In general the reaction proceeds better if at least one of the W, Y and Z groups is hydrogen. The proposed intermediate complex may or may not be stable and in either case does not need to be isolated. The metal containing product, a metal hydride also may or may not be stable. It may undergo further reactions not affecting the organic product formed. One reaction which is a very useful variation of the invention is to remove HX from the hydride with a base such as a basic tertiary amine and thereby regenerate a reactive lower valent metal complex which then can be reacted with an organic halide, RX, to reform the organometallic creating a reaction which is catalytic in the metal (wherein X is Br, Cl or I).

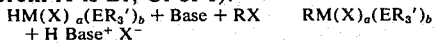

In the present invention the organic halides which may be used to form the organometallic reagent include the aryl and vinylic iodides and benzyl halides which were employed in the prior art as well as the previously unreactive aryl and vinylic bromides and chlorides. The aryl and vinylic iodides generally react considerably more rapidly and at lower temperatures in the present invention than they do by the method disclosed in the prior art. Under the proper reaction conditions a very wide variety of aryl, vinylic, benzylic and also acetylenic halides may be used in this invention. In fact one of the most useful features of it is that the reaction is very specific between a halide and the metal compound and the resulting $RM(X)_a(ER_3')_b$ and the olefinic compound, and other functional groups do not enter into the reaction. Thus halides or olefins containing hydroxyl or phenolic groups, carboxylic acid or ester groups, nitro, cyano, ketone, ether, amide, dialkylamino or sulfone groups, for example, react normally in the present reaction. In addition to aryl halides, heterocyclic halides such as bromothiophene, bromofuran, bromopyridine and bromo-N-methylpyrrole may also be reacted.

The Group VIII metal may be any of the group but palladium, nickel and rhodium have been found to be generally the most useful. It has been found preferable to employ these elements in the form of compounds which react more readily than the metals themselves when the organometallic reagents are produced in the reaction mixtures. The compounds which may be used vary from metal to metal depending upon the reactivity of the compounds in the reaction mixtures. The metal compound must either be one which can enter directly into the reaction such as $C_6H_5Pd(Cl)[P(C_6H_5)_3]_2$ or be converted into a form which enters the reaction under the reaction conditions such as occurs when palladium acetate is added to the reaction mixture containing a trivalent arsenic or phosphorus compound and the organic halide. The trivalent arsenic and phosphorus compounds can be trialkyl, triaryl, trialkoxy, halo or triphenoxy type derivatives or mixed derivatives of these. Typical examples of these are triphenylarsine, triphenyl arsenite, tri-n-butylphosphine, diphenylmethylphosphine, diphenylmethoxyphosphine, trimethyl phosphite, triphenylphosphine, triethylphosphine, phenyldi-n-butoxyphosphine, trimethylolpropane phosphite, phosphorus trichloride, phenyldichlorophosphine, arsenic tribromide, tri-p-anisylphosphine, tri-o-tolylphosphine and tri-o-tolyl phosphite. The ratio of the trivalent arsenic or phosphorus compound to the metal is not critical but generally the most rapid reaction rates are obtained when the ratio is between about 0.5:1 and 5:1. Higher ratios up to about 20:1 are often useful in improving the steriospecificity in the reactions of vinylic halides.

The reaction conditions required vary widely depending upon the reactants being used. For example, $C_6H_5Ni(BR)[P(C_6H_5)_3]_2$ reacts rapidly with methyl acrylate at room temperature while $C_6H_5Pd(Cl)[P(C_6H_5)_3]_2$ requires about 80°C in order to react. In general temperatures between about 0°C and 200°C are useful with 20°C to 150°C preferred.

These reactions may be carried out with or without solvent. Solvents such as acetonitrile, tetrahydrofuran, and excess olefinic reactant have been used successfully. The presence of excess olefin often has a beneficial effect upon the yield of product produced. When the reaction is carried out in methanol or other alcohols, reduction of the olefinic double bond may accompany the reaction to a more or less significant extent particularly when iron, cobalt and nickel complexes are reacted.

In the cases where the reaction can be carried out catalytically, bases such as metal carboxylates, carbonates, hydroxides, alkoxides, and oxides may be employed but generally better results were obtained using soluble trialkylamines as the bases. Examples of amines which can be used are tri-n-butylamine, triethylamine, diisopropylethylamine, tetramethylethylenediamine, N-methylpyrrolidone and dimethylaniline. The base should be used in an amount equivalent to or in slight excess to the organic halide employed. When the reactions proceed catalytically only small amounts of the metal or metal salt and the trivalent phosphorus or arsenic compounds need to be used. Generally one hundredth to 10 mole percent of the metal compound is sufficient compared to the organic halide.

With olefinic compounds the course of the reaction may be such that allylically substituted products are formed either exclusively or along with the more usual vinylically substituted ones. This reaction occurs when the metal hydride elimination in the last step in the above equation involves loss of the hydrogen from one of the Y, W or Z groups instead of from the initial vinylic position. At present it is not known how to predict which hydrogen will be lost. The substituent groups on the olefin do influence this, however. The allylic elimination can only occur if Y, W or Z are bonded through carbons having at least one hydrogen attached to them. For example the reaction of bromobistriphenylphosphinephenylpalladium prepared in situ from bromobenzene, $Pd(OAc)_2$ and triphenylphosphine with 1-hexene produces some 1-phenyl-2-hexene as well as the major product 1-phenyl-1-hexene.

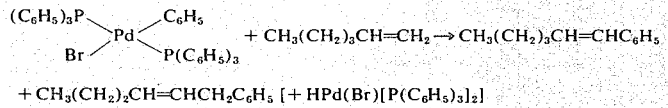

In the allylic elimination reaction, carbonyl compounds can be formed if there is a hydroxyl group at the allylic position since the carbonyl compound is the more stable tautomer of the enol first believed to be formed. For example: $C_6H_5Pd(Br)[P(C_6H_5)_3]_2$ prepared in situ from bromobenzene, palladium acetate and two equivalents of triphenylphosphine reacts with methallyl alcohol, catalytically in the presence of tri-n-butylamine and bromobenzene to form 3-phenyl-2-methylpropanol in 70% yield.

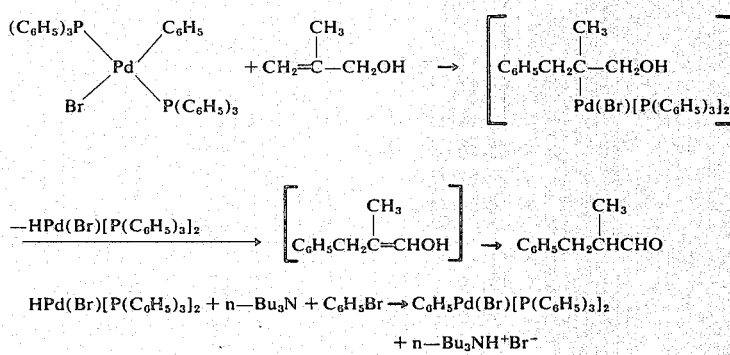

$HPd(Br)[P(C_6H_5)_3]_2 + n-Bu_3N + C_6H_5Br \rightarrow C_6H_5Pd(Br)[P(C_6H_5)_3]_2 + n-Bu_3NH^+Br^-$ The process of this invention is illustrated by the following examples.

EXAMPLE 1

A mixture of 20 mmoles of bromobenzene, 40 mmoles methyl acrylate, 20 mmoles tetramethylethylenediamine, 0.2 mmole palladium acetate and 0.4 mmole triphenylphosphine was heated in a glass vessel in an oil bath with a condenser attached at 125°C for 28 hours. At the end of this time the reaction mixture was cooled, diluted with water and the crude liquid product was separated and distilled. There was obtained pure trans methyl cinnamate in 85% yield based upon the bromobenzene used.

EXAMPLE 2

In a similar example to the above p-bromoanisole was used in place of bromobenzene and the mixture was reacted at 135°C for 36 hours. There was obtained 54% of pure trans methyl p-methoxycinnamate, m.p. 88.0°–89.5°C.

EXAMPLE 3

In an experiment similar to Example 1, methyl p-bromobenzoate was used in place of bromobenzene and tri-n-butylamine was used in place of tetramethylethylenediamine. After 7 hours reaction at 100°C there was isolated 81% of trans methyl 4-carbomethoxycinnamate, m.p. 125°–126°C.

EXAMPLE 4

A reaction similar to Example 1 was carried out with p-nitrobromobenzene in place of bromobenzene and tri-n-butylamine in place of tetramethylethylenediamine. After 7 hours at 100°C there was obtained 73% of trans methyl p-nitrocinnamate, m.p. 160°–161°C.

EXAMPLE 5

In an experiment similar to Example 1, 2-bromobiphenyl was used in place of bromobenzene and after 65 hours at 135°C there was obtained, after basic hydrolysis, 36.5% of trans o-phenylcinnamic acid, m.p. 200°–201°C.

EXAMPLE 6

A mixture of 20 mmoles bromobenzene, 25 mmoles cis-1-phenyl-1-propene, 25 mmoles triethylamine, 0.2 mmoles palladium acetate and 0.4 mmole triphenylphosphine was heated at 100°C for 82 hours. There was obtained a 92% yield of diphenylpropenes which contained 73% cis-1,2-diphenyl-1-propene.

EXAMPLE 7

A similar example to Example 6 was carried out with trans-1-phenyl-1-propene in place of the cis isomer and after 43 hours at 100°C there was obtained a 72% yield of diphenylpropenes which contained 79% of trans-1,2-diphenyl-1-propene.

EXAMPLE 8

The same experiment as in Example 6 was carried out with α-methylstyrene in place of cis-1-phenyl-1-propene. After 33 hours at 100°C there was isolated a 66% yield of diphenylpropenes of which 88% was trans-1,2-diphenyl-1-propene.

EXAMPLE 9

An experiment similar to the one in Example 6 was carried out with 1-hexene used in place of cis-1-phenyl-1-propene. After 41 hours at 100°C there was obtained 44% 1-phenyl-1-hexene and 42% of a mixture of other phenylhexenes containing 1-phenyl-2-hexene.

EXAMPLE 10

An experiment was carried out as in Example 9 with iodobenzene in place of bromobenzene. After 22 hours at 100°C there was obtained 42% 1-phenyl-1-hexene and 40% of other phenylhexenes.

EXAMPLE 11

A mixture of 20 mmoles 1-bromo-2-methyl-1-propene, 25 mmoles methyl acrylate, 25 mmoles triethylamine, 0.2 mmoles palladium acetate and 0.4 mmoles triphenylphosphine was heated in a closed glass vessel at 100°C for 70 hours. After cooling the semi-solid reaction mixture was extracted with pentane and the extracts were distilled. There was obtained trans methyl 5-methyl-2,4-hexadienoate, b.p. 90°C (13 mm), in 75% yield.

EXAMPLE 12

A similar reaction to the one described in Example 11 with trans-1-iodo-1-hexene in place of 1-bromo-2-methyl-1-propene gave after 38 hours at 100°C, trans, trans methyl 2,4-nonadienoate in 50% yield.

EXAMPLE 13

A reaction of 2-bromopropene with methyl acrylate as in Example 11 with the 2-bromopropene replacing the 1-bromo-2-methyl-1-propene lead to the formation of a Diels-Alder reaction product formed from the expected product, trans methyl 4-methyl-2,4-pentadienoate and the excess methyl acrylate. When 50 mmoles of methyl acrylate were used instead of 25, a 63% yield of that product, dimethyl 5-methyl-5-cyclohexene-1,2-dicarboxylate, was obtained.

EXAMPLE 14

The reaction of 1-iodo-1-hexyne with methyl acrylate at 25° in the presence of palladium acetate and triphenylphosphine gave a mixture of methyl 2-nonen-4-ynoate and 5,7-dodecadiyne.

EXAMPLE 15

A reaction was carried out as described in Example 6 except that 0.4 mmole of tri-o-tolyphosphine was used instead of triphenylphosphine. Essentially the same products were obtained in the same yields.

EXAMPLE 16

A reaction was carried out as described in Example 6 except that tri-p-anisylphosphine was used in place of triphenylphosphine. There was obtained the same products in approximately the same yields as with triphenylphosphine.

EXAMPLE 17

The process of Example 1 was repeated with only 0.2 mmoles of triphenylphosphine. There was obtained methyl cinnamate but only in about 40% yield in the same length of time.

EXAMPLE 18

The process of Example 1 was repeated with 0.8 mmoles of triphenylphosphine instead of 0.4 mmoles. There was obtained methyl cinnamate but only in about 50% yield in the same time period as used in Example 1.

EXAMPLE 19

A reaction was carried out between dichlorobistriphenylphosphinephenylrhodium (III) and methyl acrylate at 100°C. There was obtained as a product methyl cinnamate.

EXAMPLE 20

A mixture of 1 mmole trans-chlorobistriphenylphosphinephenylnickel (II) and 15 mmole methyl acrylate was heated at 65°C for 3.5 hours in a closed glass vessel. Analyses by vapor phase chromatography showed that methyl cinnamate had been formed in 75% yield.

EXAMPLE 21

A reaction similar to the one in Example 20 was carried out with styrene in place of methyl acrylate. Trans-stilbene was formed in 40% yield.

EXAMPLE 22

When the reaction of Example 20 was carried out in the presence of 5 ml of methanol in addition to the other materials, an 80% yield of methyl 3-phenylpropionate was obtained instead of methyl cinnamate.

EXAMPLE 23

A mixture of chlorobistriphenylphosphine-4-formylphenylnickel (II) was reacted for 12 hours at 100° C with excess methyl acrylate. There was obtained an 88% yield of trans methyl 4-formycinnamate, m.p. 78°–79°C.

EXAMPLE 24

A reaction similar to the one in Example 23 was carried out with the 4-nitrophenylnickel complex instead of the 4-formyphenyl complex. After 18 hours reaction at 100° C there was obtained 62% of trans methyl 4-nitrocinnamate, m.p. 158°–160° C.

EXAMPLE 25

The process of Example 1 was carried out with 0.4 mmoles triphenylarsine in place of triphenylphosphine. Methyl cinnamate was obtained in moderate yield.

EXAMPLE 26

The process of Example 1 was carried out with 0.4 mmoles triphenyl phosphite in place of triphenylphosphine. Methyl cinnamate was obtained in moderate yield.

EXAMPLE 27

The process of Example 1 was carried out with benzyl chloride in place of bromobenzene. There was obtained methyl 4-phenyl-3-butenoate and methyl 4-phenyl-2-butenoate in high yields as products.

EXAMPLE 28

A mixture of 1 mmole chlorobistriphenylphosphine-phenylpalladium (II) was heated with 15 mmoles methyl acrylate and 2 mmoles triethylamine at 100° C for 24 hours in a sealed glass vessel. There was obtained methyl cinnamate in 63% yield.

EXAMPLE 29

A mixture of 1 mmole bromobistriphenylphosphine-phenylplatinum (II) was heated with 15 mmoles of methyl acrylate at 100° C for 24 hours in a sealed glass vessel. There was obtained methyl cinnamate as a product.

EXAMPLE 30

A mixture of bromobenzene, methallyl alcohol, and tri-n-butylamine was heated with a catalytic amount of palladium acetate and twice as much triphenylphosphine at 100° C for 24 hours. There was obtained 3-phenyl-2-methylpropanal in 70% yield.

EXAMPLE 31

The procedure of Example 30 was used with 4-isopropylbromobenzene instead of bromobenzene and 3-(p-isopropylphenyl)-2-methylpropanol was formed in good yield.

EXAMPLE 32

The procedure of Example 30 was used with allyl acetate in place of methallyl alcohol and cinnamyl acetate was produced in good yield.

EXAMPLE 33

The procedure of Example 30 was used with acrolein dimethylacetal instead of methallyl alcohol and cinnamaldehyde dimethylacetal was formed in good yield.

EXAMPLE 34

A mixture of 3-hydroxy-1-butene and 2-methyl-1-bromo-1-propene was heated with a catalytic amount of $PdBr_2[P(C_6H_5)_3]_2$ and excess triethylamine in a closed vessel at 100° C for 30 hours. The reaction mixture was found to contain a good yield of an approximately 1:1 mixture of cis- and trans-6-methyl-3,5-heptadien-2-ol.

The products of this invention have many varied uses. The cinnamate esters, and cinnamyl esters for example are widely used in the perfumery and flavoring industries while stilbene derivatives find uses as optical brightening agents for use in detergent formulations. The process of this invention may also be used in the synthesis of drugs, for example in the synthesis of prostaglandins. It may also be used in the synthesis of other valuable natural products such as the terpene farnesol and geraniol. The process may be used to prepare various polymerizable monomers as well, such as styrene from bromobenzene and ethylene and of various sustituted styrenes by similar reactions.

The process of this invention offers considerable advantage over other methods previously available for the preparation of vinylically substituted compounds. Cinnamic esters for example were generally prepared by heating arylaldehydes with acetic anhydride and sodium acetate, isolating the cinnamic acid so formed and then esterifying it. Now the compounds can be made in one step from the less expensive halobenzene derivative and readily available acrylate esters by the process of this invention. The formation of conjugated diene derivatives is generally much more easily and often much less expensively accomplished by the use of vinylic halides as described in this invention, than was possible with the methods previously available.

As many apparently widely different embodiments of this invention may be made without departing from the spirit and scope thereof it is to be understood that this invention is not limited to the specific embodiments thereof except as defined in the appended claims.

I claim:

1. The process of producing vinylically or allylically substituted olefinic compounds or tautomeric or reduced forms thereof which comprises contacting an olefinic compound having at least one hydrogen on a vinylic position with a catalytic amount an organometallic compound of general formula $RPd(X)(PR'_3)_2$ or a combination of reagents which produces this complex under the reaction conditions and an organic halide (RX) and a basic tertiary amine, wherein R is an aryl, a vinylic, an ethynyl, heterocyclic or a benzyl group or a substituted derivative thereof, X is Br, Cl, or I and R' is an aryl group.

2. The process of claim 1 wherein the organic halide is bromobenzene and the olefinic compound is methyl acrylate.

* * * * *